United States Patent
Wicki et al.

(10) Patent No.: US 6,212,602 B1
(45) Date of Patent: *Apr. 3, 2001

(54) CACHE TAG CACHING

(75) Inventors: Thomas M. Wicki, Palo Alto; Meera Kasinathan, Sunnyvale; Ricky C. Hetherington, Pleasanton, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,305

(22) Filed: Dec. 17, 1997

(51) Int. Cl.[7] .................................................. G06F 12/00
(52) U.S. Cl. ........................... 711/122; 711/118; 711/119; 711/133
(58) Field of Search ................................... 711/122, 118, 711/117, 119, 133, 128, 116

(56) References Cited

U.S. PATENT DOCUMENTS

| | | | | |
|---|---|---|---|---|
| 5,317,718 | * | 5/1994 | Jouppi ................................... | 395/425 |
| 5,355,467 | * | 10/1994 | MacWilliams et al. .............. | 395/425 |
| 5,613,083 | | 3/1997 | Glew et al. ........................... | 395/417 |
| 5,699,551 | * | 12/1997 | Taylor et al. ......................... | 395/471 |
| 5,778,427 | * | 7/1998 | Hagersten et al. ................... | 711/128 |
| 5,813,031 | * | 9/1998 | Chou et al. ........................... | 711/122 |
| 5,860,078 | * | 1/1999 | Emmot ..................................... | 711/3 |
| 5,918,044 | * | 6/1999 | Levitan et al. ........................ | 711/125 |
| 5,918,245 | * | 6/1999 | Yung ...................................... | 711/122 |
| 5,920,889 | * | 7/1999 | Petrick et al. ........................ | 711/143 |

FOREIGN PATENT DOCUMENTS

| | | | |
|---|---|---|---|
| 0 795 828 A2 | 2/1997 | (EP) . | |
| 0 795 828 | * | 2/1997 | (EP) ........................................... 12/8 |

OTHER PUBLICATIONS

Bruce Ledley Jacob, "Software–Oriented Memory–Management Design," 1997.
Bruce Jacob and Trevor Mudge, Advanced Computer Architecture Lab, EECS Dept., University of Michigan, "Software–Managed Address Translation," Feb. 1997.
R. Rashid, A. Tevanian, M. Young, D. Golub, R. Baron, D. Black, W. Bolosky and J. Chew, Dept. of Computer Science, Carnegie Mellon University, "Machine–Independent Virtual Memory Management for Paged Uniprocessor and Multiprocessor Architectures," Oct. 1997.
Hong Wang et al.; CAT—Caching Address Tags a Technique for Reducing Area Cost of On–Chip Caches; Jun. 22, 1995; pp 381–390.

* cited by examiner

Primary Examiner—Do Yoo
Assistant Examiner—Kimberly McLean
(74) Attorney, Agent, or Firm—Philip McKay; Gunnison, McKay & Hodgson, L.L.P.

(57) ABSTRACT

A cache memory system having a cache and a cache tag. A cache tag cache is provided to store a subset of the most recently or frequently used cache tags. The cache tag cache is accessed during tag inquires in a manner similar to conventional cache tag inquires. Hits in the cache tag cache have a lower access latency than the tag lookups that miss and require access to the cache tag.

7 Claims, 4 Drawing Sheets

| VALID | PHYSICAL ADDRESS <44:6> | WAY# <1:0> | STATE |
|---|---|---|---|
| VALID | PHYSICAL ADDRESS <44:6> | WAY# <1:0> | STATE |
| VALID | PHYSICAL ADDRESS <44:6> | WAY# <1:0> | STATE |
| VALID | PHYSICAL ADDRESS <44:6> | WAY# <1:0> | STATE |
| VALID | PHYSICAL ADDRESS <44:6> | WAY# <1:0> | STATE |
| VALID | PHYSICAL ADDRESS <44:6> | WAY# <1:0> | STATE |
| VALID | PHYSICAL ADDRESS <44:6> | WAY# <1:0> | STATE |

CACHE TAG CACHING

BACKGROUND OF THE INVENTION

1. Field of the Invention

The present invention relates, in general, to cache memory, and, more particularly, to a cache memory design using long latency cache augmented by a short latency cache for caching the cache tag information held in the long latency cache.

2. Relevant Background

The ability of processors to execute instructions has typically outpaced the ability of memory subsystems to supply instructions and data to the processors. As used herein the terms "microprocessor" and "processor" include complete instruction set computers (CISC), reduced instruction set computers (RISC) and hybrids. Most processors use a cache memory system to speed memory access. Cache memory comprises one or more levels of dedicated high-speed memory holding recently accessed data, designed to speed up subsequent access to the same data.

Cache technology is based on a premise that programs frequently reuse the same instructions and data. When data is read from main system memory, a copy is also saved in the cache memory, along with the tag. The cache then monitors subsequent requests for data to see if the information needed has already been stored in the cache. If the data had indeed been stored in the cache, the data is delivered with low latency to the processor while the attempt to fetch the information from main memory is aborted (or not started). If, on the other hand, the data had not been previously stored in cache then it is fetched directly from main memory and also saved in cache for future access.

Modern processors support multiple cache levels, most often two or three levels of cache. Typically multi-level or hierarchical cache designs comprise lower cache structures that have shorter access latency than higher cache levels. As used herein, a lower cache level is a cache structure logically closer to the execution units of the processor whereas a higher cache level is logically closer to main memory or mass storage. Access latency is determined by a number of factors including physical size or capacity of the cache structure, size and complexity of the memory cells making up the cache structure, and location of the cache structure with respect to the memory access units and instruction execution units of the processor (i.e., on-chip or off-chip).

A level 1 cache (L1 cache or L1$) is usually an internal cache built onto the same monolithic integrated circuit (IC) as the processor itself. On-chip cache is typically the fastest (i.e., lowest latency) because it is smaller in capacity and can be accessed at the speed of the internal components of the processor. It is contemplated that two or more levels of cache may be implemented on chip in which case the higher cache levels are slower than the L1 cache due to physical layout, memory cell size, or a combination of other factors. On the other hand, off-chip cache has much higher latency as the off-chip propagation delays are great and off-chip cache typically has very high capacity compared to on-chip cache structures. Off-chip cache is typically much shorter latency than accesses to main memory.

Both on-chip and off-chip cache sizes of high-performance processors are continuously growing which tends to increase cache access latency relative to the processor. In contrast, processor clock speeds continually increase demanding more performance from the cache. For the foreseeable future, overall processor performance will often be limited by the cache and memory subsystem performance.

Each cache entry is typically accessed by an address tag stored separately in a tag random access memory (RAM). In a direct mapped cache each main memory address maps to a unique location in the cache. In fully associative cache, data from any main memory address can be stored in any cache location, hence, all address tags must be compared simultaneously (i.e., associatively) with the requested address, and if one matches, then its associated data is accessed. Set associative cache is a compromise between direct mapped cache and a fully associative cache where each address tag corresponds to a set of cache locations. A four-way set associative cache, for example, allows each address to map to four different cache locations.

Associative cache designs have a higher hit rate than similarly sized direct mapped caches and so offer performance advantages in particular applications such as technical and scientific applications. Associative cache is more difficult to implement when the tag store information is located off-chip or in a long latency tag RAM. In a fully associative or set associative cache design, the processor references multiple tag store RAM locations simultaneously for best performance. This requires multiple parallel input/output (I/O) pins supporting communication between the processor and an off-chip tag store. For example, a 4-way set associative cache typically requires 4 times as many I/O pins coupled to the tag store than does a direct mapped cache for best performance. As physical memory addresses become larger, the number of I/O pins is unwieldy or impossible to implement. Many times these I/O pins simply are not available. For this reason, almost all external cache designs that are supported by a microprocessor are direct mapped.

The number of address tags required in the tag store is proportional to the size of the cache. However, not only the size, (i.e., the number of tag entries) but also the physical width of the address tag is typically growing because larger physical memories need to be addressed. Larger physical memory spaces require more address bits and correspondingly wider memory to store each address tag. The address tag RAM physical size or capacity is the product of these parameters and so is growing faster than the cache itself.

It is desirable to minimize access time to read the contents of the cache tag. The cache tag contents are read to determine if requested data exists in the cache or whether the data must be fetched from main memory or mass storage. Access latency is greatest in higher cache levels. In most designs, at least some high-level cache is provided off-chip (i.e., in a discrete integrated circuit separate from the processor) therefore exhibiting even longer access latency.

To minimize access latency to cache tag it is desirable to keep the cache tag on-chip even for off-chip cache. However, because the area required by the cache tag is increasing faster than the cache itself, it is increasingly difficult to provide even the cache tag storage on-chip. A need exists for a cache design that reduces the area requirements for the tag store so that the tag information can be implemented on-chip to minimize cache tag access latency.

One method of reducing the size of the cache tag store is to increase the atomic unit of information addressed by each cache tag. This can be done by increasing the "granularity" of the cache. The "granularity" of a particular cache level refers to the smallest quantity of data that can be addressed, often referred to as the size of a cache line. Larger cache lines hold more data in each line and so the address can be less specific (i.e., the address requires fewer bits). This also results in fewer cache lines for a given cache size which is the more important effect. However, larger cache lines frequently result in loading data into cache that is not used as an entire cache line is filled even for a small memory request. Hence, increasing granularity results in inefficient cache usage and wasted data bandwidth in many applications. Using a technique called sub-blocking, selected levels (usually higher cache levels) in a hierarchical cache have a higher tag granularity by providing a set of valid bits per tag. Each valid bit corresponds to the size of a cache line of the lower-level cache. Hence, sub-blocking is a compromise that can be applied to improve cache efficiency of the lower cache levels while reducing the tag size of higher cache levels. Sub-blocking increases complexity of cache management, however, and, in particular, makes replacement more difficult. For example, sub-blocking is inefficient in inclusive cache designs.

The limitations of long latency cache pose particular problems in some processor applications. Particular examples include multiprocessing (MP) machines. In multiprocessors, instructions that incur a long latency memory access may result in stalling all instructions threads that operate on the long latency data. Typically the requesting processor will launch a memory access request and simultaneously broadcast a snoop request to all other processors. The other processors handle the snoop request by performing a tag store inquiry to identify whether a modified copy of the requested data exists in their cache. The requesting processor must wait until the inquiries are complete before committing itself to using the data obtained from the memory access requests. Hence, it is desirable to minimize the portion of the snoop latency associated with accessing long latency tag store information.

In speculative execution processors, including uniprocessor and multiprocessor machines, some instructions cannot execute until a prior instruction has completed execution and the results are available. For example, an instruction that operates on data fetched from memory is dependent upon one or more preceding memory instructions (e.g., a load instruction) that fetch the required data from memory into working registers. The dependent instruction cannot execute until all of the stored values have been retrieved from memory. Also, some instructions determine an address for a subsequent memory access instruction and so the subsequent instruction cannot execute until the prior instruction's results are available. This results in a situation called "pointer chasing" that imposes the memory access latency on multiple instructions.

In these applications and others, processor performance is very dependent on the latency to the various levels of cache and main memory. To expedite execution of dependent instructions, each cache level is probed by examining the tag store for that cache level to determine whether the required data exists in that cache level. Based upon results of the tag store inquiry, the dependent operation can be launched sooner when it is determined that the required data exists in cache. In the case of off-chip cache, however, the off-chip tag information can take many microprocessor cycles to return.

SUMMARY OF THE INVENTION

The present invention involves a cache memory system having cache tag information stored in a long latency cache tag RAM. A low latency cache tag cache is provided to store a subset of the most recently or frequently used cache tag information from the long latency cache tag RAM. The low latency cache tag cache is accessed during tag inquires in a manner similar to conventional cache tag inquires. Hits in the low latency cache tag cache have a lower access latency and provide the tag information without requiring access to the high latency cache tag RAM. Preferably, a least recently used (LRU) algorithm is used to replace cache tags in the cache tag cache.

In another aspect, the present invention involves a method for operation of a long latency cache memory having a cache tag information stored in a long latency cache tag array. Cache system accesses are generated where each access comprises an address identifying a memory location having data that is a target of the access. A low access latency cache tag cache coupled to the processor stores a portion of the tag information from the long latency cache tag array. A first cache tag lookup is performed by applying the address in an access to the low latency cache tag cache. In response to the first cache tag lookup, a hit/miss signal is generated in the low latency cache tag cache. In response to a hit in the low latency cache tag cache, the address tag information in the cache tag cache is used to access data in the long latency cache.

DESCRIPTION OF THE PREFERRED EMBODIMENTS

The present invention involves a method and apparatus for operating a processor using an external data cache and an external cache tag storage. As used herein, a data cache may actually cache instructions and/or data hence the word "data" includes data that represents instructions. In accordance with the present invention, a subset of cache tag information is stored in on-chip (i.e., integrally formed in the same integrated circuit (IC) chip as the processor) low latency memory. The present invention is illustrated in a three-level cache system where the "cache tag cache" in accordance with the present invention is located between the second and third cache levels. However, it is contemplated that any number of cache levels may be implemented, including a single cache level, and make use of the present invention.

Figure 1:
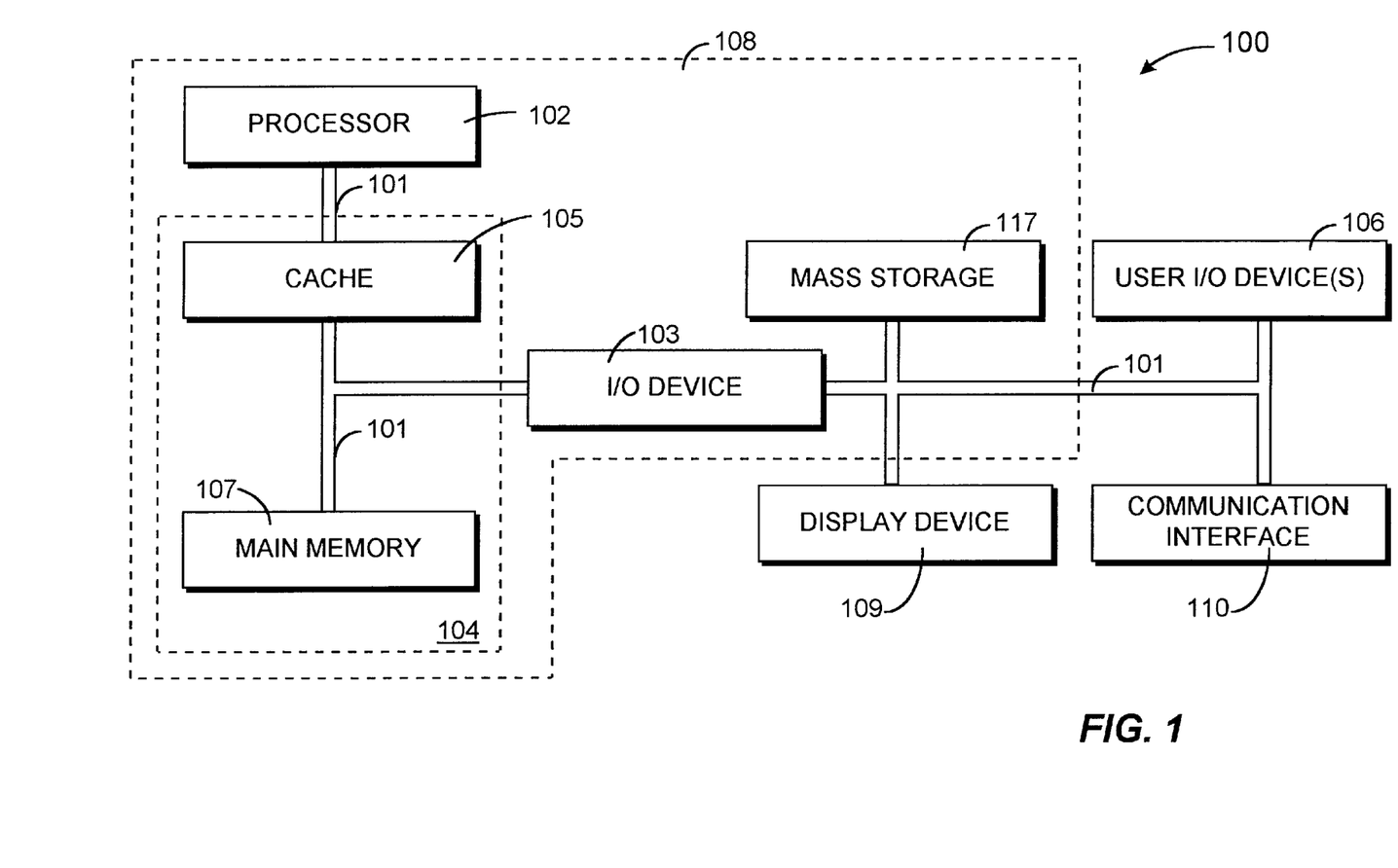
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
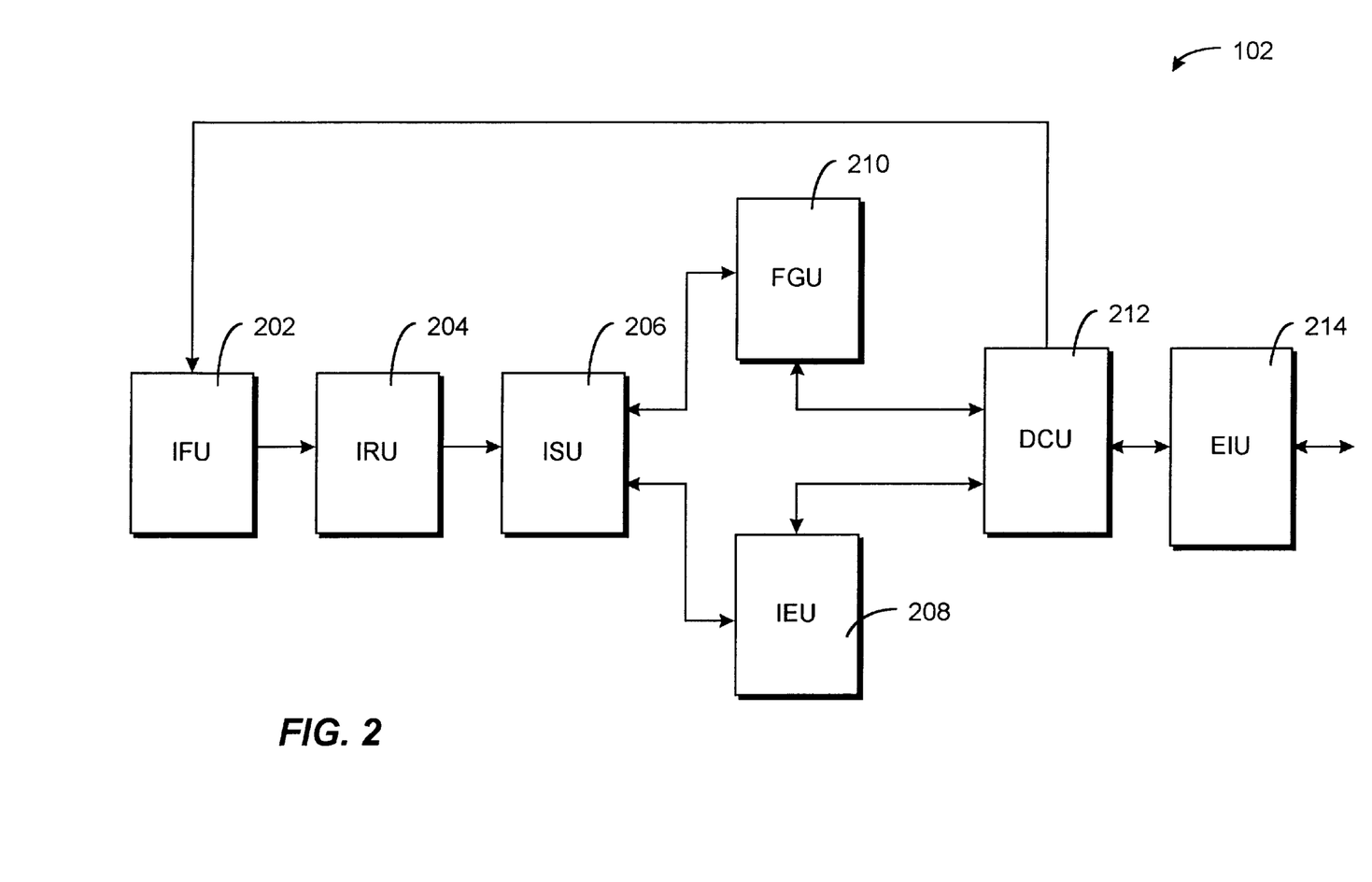
FIG. 2 shows a processor in block diagram form incorporating the apparatus and method in accordance with the present invention.

The present invention is described in terms of an apparatus and a method particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory, at least one level of which is implemented on a separate integrated circuit from processor 102. In a typical embodiment, processor 102, I/O device 103, and some of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input/output devices, including another computer. Mass storage device 117 is coupled to bus 101 and may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD), a printer or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature is often used to identify equivalent functional units.

Instruction fetch unit (IFU) 202 comprises instruction fetch mechanisms and includes, among other things, an instruction cache (I$ 301 in FIG. 3), which is also a part of cache subsystem 212, for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing instruction cache 301. Typically IFU 202 generates logical or virtual addresses to a translation lookaside buffer 311 (shown in FIG. 3) which in turn generates physical addresses used by cache unit 212. The instruction cache 301 feeds addressed instructions to instruction rename unit (IRU) 204.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to instruction cache 301 rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent certain types of dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched but has not yet completed or been retired. IRU 204 outputs renamed instructions to instruction scheduling unit (ISU) 206.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all prior instructions have completed. Upon retirement the instruction's result is written into the appropriate register file.

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in a processor. In the particular implementation described herein, IEU 208 executes all integer instructions including determining correct virtual addresses for load/store instructions. IEU 208 also maintains correct architectural register state for a plurality of integer registers in processor 102.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units. In the specific example, FGU 210 also includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used.

A data cache memory unit (DCU) 212, including cache memory 105 shown in FIG. 1, functions to cache memory reads from off-chip memory 107 through external interface unit (EIU) 214. Optionally, DCU 212 also caches memory write transactions. DCU 212 comprises one or more hierarchical levels of cache memory 105 and the associated logic to control the cache memory 105. One or more of the cache levels within DCU 212 may be read-only memory (from the processor's point of view) to eliminate the logic associated with cache writes.

Figure 3:
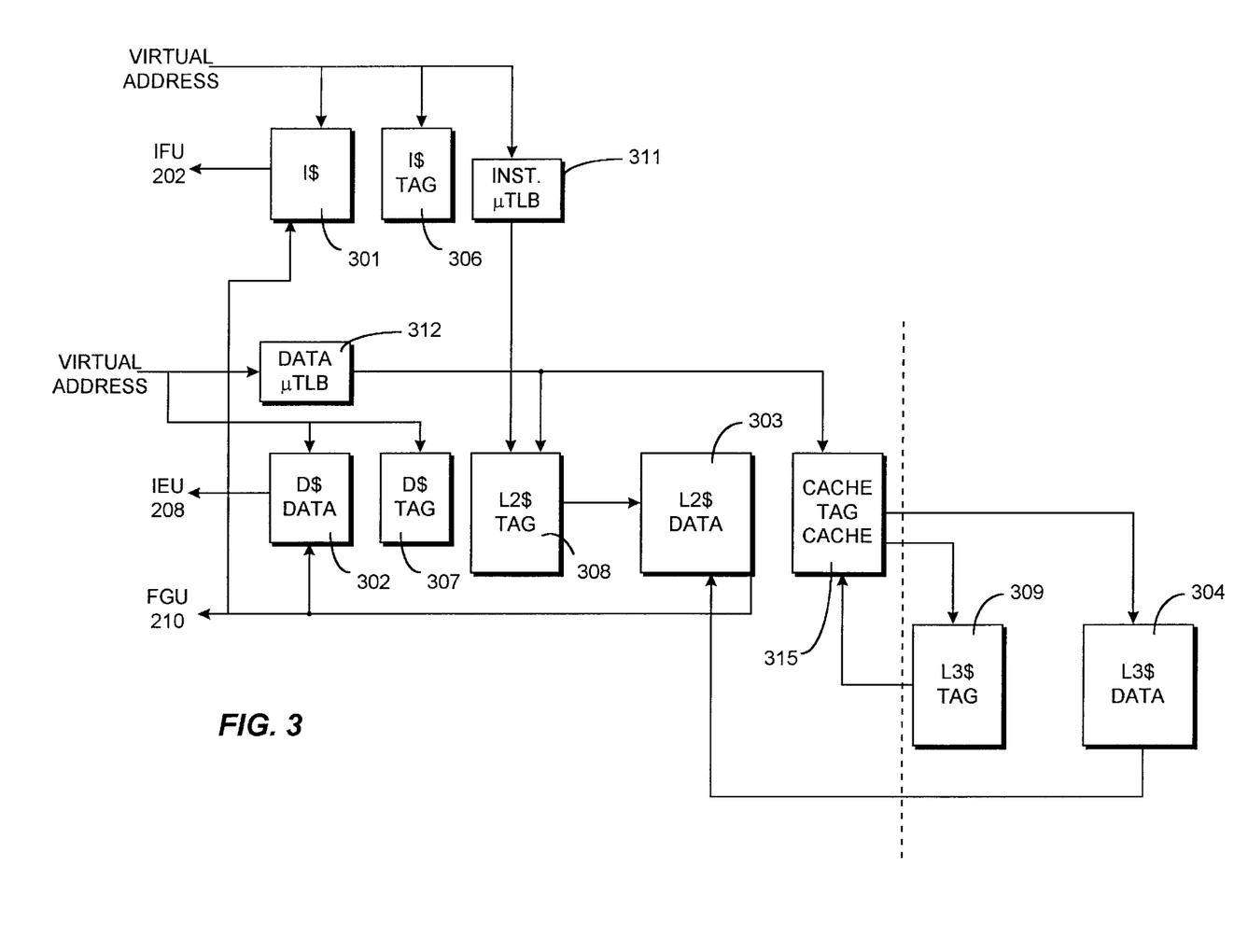
FIG. 3 illustrates in block diagram form a high level overview of a cache subsystem in accordance with the present invention.

DCU 212 in accordance with the present invention is illustrated in greater detail in FIG. 3. DCU 212, alternatively referred to as the data cache subsystem, comprises separate instruction cache 301 and data cache 302 (labeled I$ and D$ in FIG. 3). In a typical implementation, although, a unified instruction/data cache is an equivalent substitute in some applications. Using separate caches 301 and 302 to store recently used instructions and recently accessed data increases efficiency in many applications. The first level caches I$ 301 and D$ 302 are virtually indexed and physically tagged in a specific embodiment. These caches have each line indexed by virtual address, however the tag bits are from the physical address determined after the virtual address is translated. I$ 301 and D$ 302 may be implemented as direct mapped, n-way set associative, or fully associative caches to meet the needs of a particular application. Accordingly, these other implementations are equivalent to the specific embodiments described herein for purposes of the present invention.

A unified on-chip level 2 cache 303 (labeled L2$ DATA), and a unified external level 3 cache 304 (labeled L3$ DATA) are also used. Associated with each cache 301–304 is a tag memory 306–309 respectively that stores address tag information relating to the data stored in the associated cache. A tag memory is also called a "tag store" or "tag array". The addresses stored in the tag arrays 306–309 are the physical addresses from main memory 107 that have data corresponding to the data or instructions held in the cache 301–304 associated with the tag array 306–309.

IFU 202 generates virtual addresses coupled to instruction cache 301 (when instruction cache 301 is virtually indexed) and to instruction micro-translation lookaside buffer (μTLB) 311 to enable instruction fetching from physically-addressed cache levels and main memory. In a particular example, IEU 208 includes one or more memory pipes generating virtual addresses to virtually indexed data cache 302 and to micro-translation lookaside buffer (μTLBs) 312 for integer and floating point load and store operations. Virtual-to-physical address translation occurs in a conventional manner through micro translation lookaside buffers (μTLBs) 311 and 312 that are hardware controlled subsets of a main translation lookaside buffer (TLB) (not shown). TLBs store the most-recently used virtual:physical address pairs to speed up memory access by reducing the time required to translate virtual addresses to physical addresses needed to address memory and cache. TLB misses are handled using any available technique, including hardware and software handling, to generate the virtual:physical pair when the pair does not exist in the TLB.

When a request is made for instructions at a particular address, a tag inquiry is performed by comparing the physical address from TLB 311 with the addresses in tag array 306. The physical address is also coupled, desirably in parallel, with L2$ tag array 308 cache tag cache 315 in accordance with this invention. In this manner, tag inquiries are conducted in parallel to expedite results from all tag memories. Similarly, when a request is made for data at a particular address, a tag inquiry is performed by comparing the physical address from TLB 312 with the addresses in D$ tag array 307. The physical address is also coupled, desirably in parallel, with L2$ tag array 308 and cache tag cache 315 in accordance with this invention to expedite results from all tag memories.

Each cache line is associated with a status bit that indicates whether the line is valid (i.e., filled with known correct and up-to-date data or instructions). If the address matches a valid address in the tag array (i.e., a cache read hit), the information is accessed from the cache memory; if not, then a higher cache level or the main memory is accessed for the information that is then substituted into the cache memory for use by the data processing unit. In the case that the missing cache does not have a line allocated for the requested memory location, one is allocated. As the data is returned from higher cache levels or main memory, it is stored in the allocated line for future use.

When processor 102 attempts to write data to a cacheable area of memory, it first checks if a cache line for that memory location exists in one or more of caches 301–304. If a valid cache line does exist, processor 102 (depending on the write policy currently in force) can write the data into the cache 301–304 instead of (or in addition to) writing it out to main memory 107. This operation is called a "write hit". If a write misses the cache (i.e., a valid cache line is not present in the appropriate cache 301–304 for area of memory being written to), processor 102 performs a cache line fill by allocating a line for the requested data for a write allocate cache policy and by copying the data from a higher cache level or main memory into that line. Cache system 105 then writes the data from internal registers into the allocated cache line and (depending on the write policy currently in force) can also write the data to main memory 107. For ease of description and understanding the present invention is not illustrated with write back cache units that are commonly used to buffer data while it is written to higher cache levels. The use and design of write back buffers is well known, and any available technology may be used in accordance with the present invention. In a particular example, I$ 301, D$ 302, L2$ 303 and L3$ 304 are implemented as non-blocking caches.

The level 3 cache is off-chip in the particular embodiment of FIG. 3 as suggested by the dashed line in FIG. 3, although the present invention is also applicable to on-chip caches. Most architectures must implement at least some, if not all, cache off-chip. Latency of the off-chip cache may be three to five times that of on-chip cache. The L3 cache may be implemented using, for example, SRAM with single or dual date rate (DDR). DDR is typically a synchronous component that provides a clock along with returned data that enables a very high data rate in the order of gigabytes. In a particular example, L3 cache 304 is set associative, although direct mapped designs may also be used. L3 cache 304 may be inclusive or non-inclusive and may use sub-blocking.

In the particular example, instruction TLB 311 and data TLB 312 generate 45 bit physical addresses capable of physically addressing 32 TeraByte of memory. This physical address bit width is provided to illustrate the size and capacity impact on each of I$ tag 306, D$ tag 307, L2$ tag 308 and particularly upon L3$ tag 309 which are all large in a well-balanced system and not as a limitation upon the present invention. Main memory 107 can be implemented in any available RAM component such as DRAM, FPM DRAM, EDO DRAM, RAMBUS, SDRAM, or SDRAM2 which like the DDR SRAM discussed above provides a clock along with data allowing it to provide high bandwidth performance.

In accordance with the present invention, cache tag cache unit 315 is provided on-chip to hold a copy of recently or frequently used cache tag information from L3 cache TAG unit 309. Even where the external cache tag 309 is off-chip, cache tag cache 315 makes the most used cache tag information available with high bandwidth and low latency associated with on-chip cache tags. On-chip cache tag cache may be fully associative, set associative, or direct mapped to meet the needs of a particular application.

Cache tag cache unit 315 enables processor 102 to process tag inquires more efficiently when the tag information is present in cache tag cache 315 to minimize the impact of off-chip L3 cache tag 309 on processor. Cache tag cache 315 also responds more quickly to a snoop than can external L3 cache tag 309.

Figure 4:
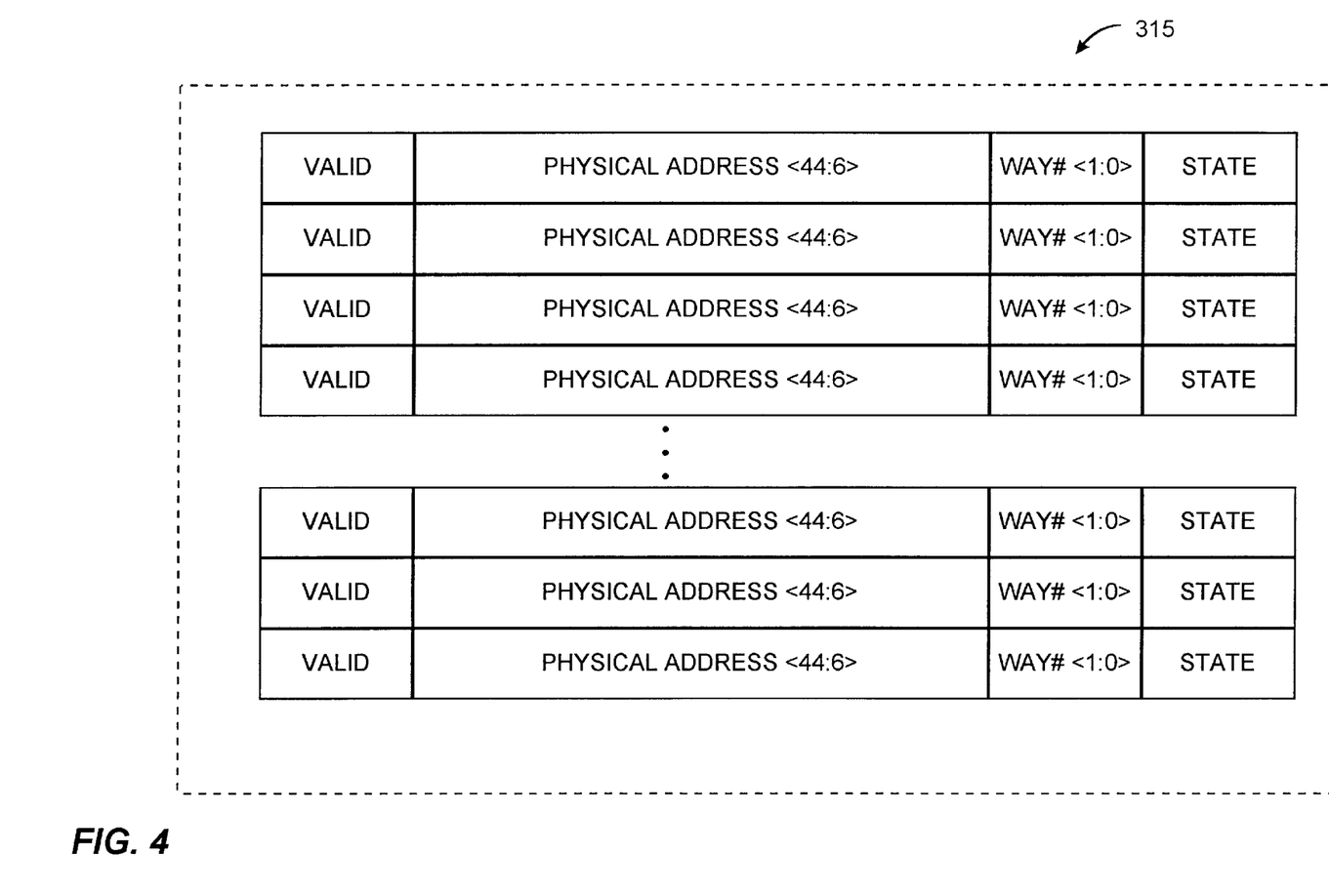
FIG. 4 shows an exemplary layout of a cache tag cache in accordance with the present invention.

Cache tag cache unit 315 comprises a plurality of entries, each entry corresponding to one of the cache tag entries in external L3 cache tag unit 309 as shown in FIG. 4. In a particular example cache tag cache 315 is fully associative with each entry representing a 64-byte cache line and L3 cache 304 comprises a 4-way set associative cache. Each entry comprises a physical address from the associated entry in cache tag 309, a way# identifier from cache tag 309 if L3 cache is set-associative, a valid bit indicating whether the entry contains a valid tag, and a number of other bits indicating state information. This state information comprises, for example bits indicating whether the referenced cache line is read-only, and may include age and use state used by a replacement algorithm. The tag information in cache tag cache 315 is consistent with (i.e., includes all of the information including state information) the corresponding cache information in cache tag store 309, although cache tag cache 315 comprises fewer entries than cache tag store 309. This ensures that a hit in cache tag cache 315 can completely replace the need to access long latency cache tag store 309. The state information in cache tag cache 315 includes unique state information used by the cache tag cache replacement algorithm in a preferred example. Because cache tag cache 315 includes the valid bit from the corresponding entry in cache tag store 309, a hit in cache tag cache 315 provides information not only about the existence of data in cache 304, but also whether the information is valid for use. Hence a tag match in cache tag cache 315 that indicates the represented entry is invalid will prevent any time consuming attempt to retrieve this information from cache tag store 309. Cache tag cache 315 and cache tag 309 may operate using either a write back or write through write policy. In operation, when an entry is removed from cache tag 309, it is also removed from cache tag cache 315.

The way# field is desirable even where the level of associativity is equal between cache tag store 309 and cache tag cache 315. For example, if both are 4-way set associative, matching the ways to avoid using the way# field will reduce performance significantly. Each way in a set associative cache tag cache 315 should be able to point to entries in the same way or any other way (i.e., any arbitrary way) of data cache 304 for maximum performance.

Usually, the capacity of cache tag cache 315 will be smaller than the L3$ tag 309 thereby resulting in area savings on the integrated circuit of processor 102 and higher access speeds. In general, the organization of cache tag cache 315 is completely independent of the organization of L3 tag 309. In a particular example, cache tag cache 315 has higher associativity or is fully associative as its small capacity enables fully associative implementation even where the size of cache tag store 309 does not allow full associativity. The choice of degree of associativity is based on a balance of size of cache tag cache 315 against complexity. Because cache tag cache 315 will be small in most applications, this balance can often be biased in favor of higher associativity. For set associative implementations where address bits are used to index cache tag cache 315, the number of physical address bits stored in the physical address field of each entry is reduced by $\log_2$(number of entries/associativity) as compared to a fully associative implementation.

In operation, cache tag cache unit 315 functions much like other cache systems in that it receives physical addresses and compares the received address with stored addresses. When a match is detected, a hit is generated indicating that the requested data exists in L3 cache 304. When a match is not detected, a miss is generated. A miss does not indicate that the data is not in L3 cache 304, but instead indicates that the system will have to wait for L3 cache tag 309 to determine if the data exists. Hence, a primary benefit of the present invention is early identification of the existence of data in L3 cache 304 if tag information is present in 315.

In a preferred implementation, when a cache line in L2$ 303 is evicted, cache tag cache 315 is updated with a new tag entry corresponding to the physical address of the evicted data. Using this method for filling entries in cache tag cache 315 results in the addresses in cache tag cache 315 tending to be different from the addresses stored in L2$ tag store 308 and thereby maximizes the quantity of tag store information that is held in low-latency devices. Because cache tag cache 315 is smaller than L3 cache tag 309, a suitable replacement algorithm (e.g., a least recently used (LRU) algorithm or equivalent) is used to overwrite or replace entries in cache tag cache 315 when there is an eviction. It should be noted the LRU used to replace tag information in cache tag cache 315 is independent from the LRU used to replace data in L3 cache 304 (and tag 309). When a line is removed from L3 cache 304, it is necessary to lookup the associated entry in the cache tag cache 315 and invalidate it if present (i.e., turn off the valid bit in the appropriate entry).

Experience with conventional cache designs suggests that even a modestly sized cache tag cache 315 will have a sufficiently high hit rate to significantly improve system performance. The present invention is particularly useful when the data being fetched is characterized by a high degree of temporal locality.

An advantage of the present invention is that it can enable L3 cache 304 and tag 309 to be implemented as set associative using fewer I/O pins to communicate with processor 102 than used in typical designs. In a typical n-way set associative L3 cache 304 all n address tags from tag 309 are loaded into processor 102 in parallel to reduce latency. This parallel loading requires more I/O pins. Assuming a high hit rate in cache tag cache 315, the n address tags from L3 tag 309 can be transferred sequentially to processor 102 using only one set of pins without significant impact on performance.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, although a single cache tag cache is described for each external cache, it is contemplated that multiple cache tag caches may be provided. An on-chip cache tag cache may be provided for each set in an external set associative cache. Cache tag cache and cache tag may both be implemented on-chip and provide improved performances since the cache tag cache is lower latency due to its smaller size. Also, the on-chip cache tag cache may be implemented recursively such that a second cache tag cache is provided to cache a portion of the tag address information stored in a first cache tag cache. Moreover, a cache tag cache may be implemented for a particular function such as to cache tag address information required by snoop requests from other processors in a multi-processor system. These and other modifications and extensions of the present invention are within the scope and spirit of the invention, as hereinafter claimed.

We claim:

1. A multi-level cache system comprising:
    a first-level cache comprising a first-level cache tag store, a first-level data store having a plurality of data storage lines for storing data, and a first-level cache controller, the first-level cache controller implementing a replacement algorithm whereby data stored in data storage lines of the first-level data store is selected for replacement, the first level cache residing on a first silicon chip;
    a second-level cache comprising a second-level cache tag store, a second-level cache tag cache, a second-level cache controller, and a second-level data store, the second level cache residing on the first silicon chip; and
    a third level cache comprising a third-level cache tag store, a third-level data store and a third-level cache controller, the third level cache being coupled to the second-level cache tag cache and residing on a second silicon chip;
    wherein a line of the second level cache tag cache is updated with tag data from a first-level tag location of the first-level cache tag store when the first-level cache controller selects a data storage line of the first-level data store for replacement; and
    wherein the tag data from a first-level tag location is associated with the data storage line of the first-level data store selected for replacement.

2. The multi-level cache system of claim 1, wherein the third-level cache is organized as an n-way set-associative cache, and wherein a way number of the third-level cache is stored in the cache tag cache.

3. A computer system comprising:
    a processor;
    a main memory;
    a multi-level cache system further comprising:
        a first-level cache comprising a first-level cache tag store, a first-level data store having a plurality of data storage lines for storing data, and a first-level cache controller, the first-level cache controller implementing a replacement algorithm whereby data stored in data storage lines of the first-level data store is selected for replacement, the first level cache residing on a first silicon chip;
        a second-level cache comprising a second-level cache tag store, a second-level cache tag cache, a second-level cache controller, and a second-level data store, the second level cache residing on the first silicon chip; and
        a third level cache comprising a third-level cache tag store, a third-level data store and a third-level cache controller, the third level cache being coupled to the second-level cache tag cache and residing on a second silicon chip;
        wherein a line of the second level cache tag cache is updated with tag data from the first level cache tag store when the first-level cache controller selects data storage lines of the first-level data store for replacement.

4. A method of caching data in a data processing system having a main memory, said method comprising:
    providing a first-level cache comprising a first-level cache tag store, a first-level data store, and a first-level cache controller on a first silicon chip;
    providing a second-level cache comprising a second-level cache tag store, a second-level cache, cache tag cache, a second-level cache controller, and a second-level data store on the first silicon chip;
    providing a third level cache comprising a third-level cache tag store, a third-level data store and a third-level cache controller, the third level cache being coupled to the second-level cache tag cache and residing on a second silicon chip;
    determining if requested data is present in the first or second-level data store based upon a read-request address from a processor of the data processing system and information read from the first or second-level cache tag store;
    evicting data as necessary from the data storage line of the first or second-level cache to make room for the requested data;
    if the requested data is not in the first or second-level data store, fetching a tag from a store of a group consisting of the second-level cache tag cache and the third-level cache tag store to determine if the requested data is in the third-level cache;
    if the requested data is not in the first or second-level data store, and the requested data is found to be in the third-level cache, fetching the requested data to the processor of the data processing system and to a data storage line of the first or second-level cache;
    if the requested data is not in the first or second-level data store, and if the requested data is found not to be in the third-level cache, fetching the requested data from a store other than the third-level cache to the processor of the data processing system and to a data storage line of the first or second-level cache; and if data is evicted from the data storage line, copying a tag of the first or second-level cache corresponding to the evicted data to the cache tag cache of the second-level cache.

5. The method of claim 4 wherein the third-level cache is an n-way set associative cache, and the cache tag cache stores a way number of the n-ways as part of each tag.

6. The multi-level cache system of claim 1, wherein the first-level cache is a cache selected from a group consisting of an N-way set associative cache where N is an integer greater than one, and a fully associative cache.

7. The multi-level cache system of claim 1, wherein the third-level cache is an N-way set associative cache having several tags fetched upon each miss of the cache tag cache, where each of the several tags corresponds to a different way number of the third-level cache, the several tags fetched are fetched in sequence over a set of wires, the set of wires being wide enough for at least one tag but being too narrow for the several tags simultaneously.

* * * * *